(12) United States Patent
Chisholm

(10) Patent No.: US 11,000,993 B2
(45) Date of Patent: May 11, 2021

(54) ADDITIVE MANUFACTURING COMPOSITION

(71) Applicant: Lucite International Speciality Polymers and Resins Limited, Billingham (GB)

(72) Inventor: Michael Stephen Chisholm, Newton Aycliffe (GB)

(73) Assignee: LUCITE INTERNATIONAL SPECIALITY POLYMERS AND RESINS LIMITED, Billingham (GB)

( * ) Notice: Subject to any disclaimer, the term of this patent is extended or adjusted under 35 U.S.C. 154(b) by 190 days.

(21) Appl. No.: 16/065,208

(22) PCT Filed: Dec. 22, 2016

(86) PCT No.: PCT/GB2016/054035
§ 371 (c)(1),
(2) Date: Jun. 22, 2018

(87) PCT Pub. No.: WO2017/109497
PCT Pub. Date: Jun. 29, 2017

(65) Prior Publication Data
US 2019/0016042 A1    Jan. 17, 2019

(30) Foreign Application Priority Data
Dec. 22, 2015  (GB) ..................................... 1522691

(51) Int. Cl.
| | | |
|---|---|---|
| *B29C 64/153* | (2017.01) | |
| *B29C 64/141* | (2017.01) | |
| *C08L 33/04* | (2006.01) | |
| *C08J 3/12* | (2006.01) | |
| *C08F 290/04* | (2006.01) | |
| *C08L 33/12* | (2006.01) | |
| *C08F 2/30* | (2006.01) | |
| *C08F 285/00* | (2006.01) | |
| *C08F 2/20* | (2006.01) | |
| *C08F 212/08* | (2006.01) | |
| *C08F 220/14* | (2006.01) | |
| *C08L 15/00* | (2006.01) | |
| *C08L 67/00* | (2006.01) | |
| *C08L 71/00* | (2006.01) | |
| *C08L 75/04* | (2006.01) | |
| *B33Y 70/00* | (2020.01) | |
| *B33Y 10/00* | (2015.01) | |
| *B33Y 80/00* | (2015.01) | |
| *C08F 2/18* | (2006.01) | |

(52) U.S. Cl.
CPC .............. *B29C 64/153* (2017.08); *C08F 2/20* (2013.01); *C08F 2/30* (2013.01); *C08F 212/08* (2013.01); *C08F 220/14* (2013.01); *C08F 285/00* (2013.01); *C08F 290/048* (2013.01); *C08J 3/126* (2013.01); *C08L 15/005* (2013.01); *C08L 33/04* (2013.01); *C08L 33/12* (2013.01); *C08L 67/00* (2013.01); *C08L 71/00* (2013.01); *C08L 75/04* (2013.01); *B29C 64/141* (2017.08); *B29K 2995/0089* (2013.01); *B33Y 10/00* (2014.12); *B33Y 70/00* (2014.12); *B33Y 80/00* (2014.12); *C08F 2/18* (2013.01); *C08F 2500/24* (2013.01); *C08L 2205/22* (2013.01); *C08L 2207/53* (2013.01)

(58) Field of Classification Search
CPC ..... B29C 64/00; B29C 64/141; B29C 64/153; C08L 33/08; C08L 33/10; C08L 33/12; C08L 55/02; C08L 51/00; C08L 51/04; C08L 2207/02
See application file for complete search history.

(56) References Cited

U.S. PATENT DOCUMENTS 3,925,510 A  *  12/1975  Ide .......................... C08L 27/06
                                                          525/73
4,097,555 A  *   6/1978  Moran ................... C08F 291/02
                                                         260/880 R
(Continued)

FOREIGN PATENT DOCUMENTS

| CN | 1194992 A | 10/1998 | |
| JP | 2003-305777 A * | 10/2003 | .............. B22F 3/105 |
| WO | 2015/091817 A1 | 6/2015 | |

OTHER PUBLICATIONS

JP 2003-305777 A (Oct. 28, 2003); machine transalation in English (Year: 2003).*

(Continued)

*Primary Examiner* — Rip A Lee

(74) *Attorney, Agent, or Firm* — Shumaker, Loop & Kendrick, LLP

(57) ABSTRACT

An additive manufacturing composition for powder bed processes is described. The composition includes at least a first type of impact modified polymer beads. The polymer beads include a) an acrylic or vinyl (co)polymer matrix, and b) an impact modifier in which at least 85% w/w of the first type of impact modified polymer beads have a particle size of between ≥20 μm and ≤200 μm and/or on average the impact modified polymer beads have greater than 5% w/w impact modifier. Also disclosed is an additive manufacturing process for a production of a three dimensional product comprising fused impact modified polymer particles. The use of a composition in additive manufacturing, an additive manufacturing cartridge or replacement hopper and a process for the production of impact modified polymer beads by a suspension polymerization process is also disclosed.

16 Claims, No Drawings

(56) References Cited

U.S. PATENT DOCUMENTS

| | | | | |
|---|---|---|---|---|
| 4,598,123 | A * | 7/1986 | Cutter | C08L 33/12 |
| | | | | 525/84 |
| 5,817,206 | A * | 10/1998 | McAlea | B33Y 70/00 |
| | | | | 156/272.8 |
| 6,312,132 | B1 * | 11/2001 | Pavelka | B32B 27/20 |
| | | | | 156/305 |
| 7,067,188 | B1 * | 6/2006 | Yang | B29C 70/64 |
| | | | | 428/327 |
| 7,259,210 | B2 * | 8/2007 | Puckett, Jr. | A61L 24/06 |
| | | | | 523/115 |
| 9,714,314 | B2 * | 7/2017 | Navarro | C08F 285/00 |
| 2005/0049332 | A1 * | 3/2005 | Higuchi | C08F 285/00 |
| | | | | 523/335 |
| 2007/0055017 | A1 * | 3/2007 | Schultes | C08L 33/062 |
| | | | | 525/101 |
| 2011/0129682 | A1 * | 6/2011 | Kurata | C08L 23/0815 |
| | | | | 428/500 |
| 2014/0131908 | A1 * | 5/2014 | Sun | A61C 13/0013 |
| | | | | 264/16 |
| 2016/0177078 | A1 * | 6/2016 | Naito | C08L 67/04 |
| | | | | 264/109 |
| 2016/0312022 | A1 * | 10/2016 | Niessner | B33Y 70/00 |
| 2016/0333153 | A1 * | 11/2016 | Hirata | B29C 64/153 |

OTHER PUBLICATIONS

International Search Report and the Written Opinion carried out by the European Patent Office dated Mar. 21, 2017 for PCT/G62016/054035.

International Preliminary Report on Patentability issued by the International Bureau of WIPO dated Jun. 26, 2018 for PCT/GB2016/054035, 7 pages.

* cited by examiner

ADDITIVE MANUFACTURING COMPOSITION

TECHNICAL FIELD AND BACKGROUND

The present invention relates to additive manufacturing compositions. More specifically, the present invention relates to additive manufacturing compositions comprising impact modified polymer beads.

Additive Manufacturing (AM) (also known as 3D printing or rapid prototyping) is the process by which digital 3D design data is used to build up a component in layers by depositing materials such reactive liquids, foodstuffs, starch, polymer powder, metals, gypsum and other inorganic powders.

Generally, AM technologies employ the use of a computer, 3D modelling software (termed Computer Aided Design (CAD)), printing equipment and layering material. Once a CAD sketch is produced, the AM equipment reads data from the CAD file and lays down or adds successive layers of build material such as liquid, powder or sheet material in a layer-upon-layer fashion to fabricate a 3D object.

The principal AM technologies that utilise polymer powders as the build material are powder binding, laser sintering and heat sintering.

In the powder binding technology, an inkjet print head moves across a bed of powder, selectively depositing a liquid binding material, either a solvent for the polymer particles or a monomer system that rapidly cures. In either case, the polymer particles are adhered together. A thin layer of powder is then spread across the completed section and the process is repeated with each layer adhering to the last.

Heat sintering works by using a thermal print head or infra-red heat source to apply heat to layers of polymer powder. The selectively heated polymer particles melt and fuse together. When a layer is finished, the build platform moves down, and an automated roller adds a new layer of material which is then sintered to form the next cross-section of the model.

Laser sintering works in a similar fashion, except a high powered laser is used to selectively heat the polymer particles.

Laser sintering and heat sintering have the advantage over the ink jet approach in that they do not rely on a solvent or monomer binder to fuse the particles together. The properties of the resultant printed part are therefore not compromised by any deficiencies stemming from the solvent or monomer binder, such as plasticisation, odour, colour, reduced mechanical properties, etc.

The polymer powders used in such methods should have good powder flow characteristics to allow the powder to be effectively dispensed from the hopper onto the target surface. It is also desirable that the powder produces printed articles that have good mechanical properties and/or surface finish, such as uniform roughness.

However, it has been found that the irregularly shaped polymer particles produced by many common methods of manufacturing polymer powders such as milling of polymer pellets, lead to poor flow characteristics and uneven surface finish. Further, powders made from polymers such as polymethylmethacrylate (PMMA) and polystyrene (PS) have been found to have unsatisfactory mechanical properties.

Previous attempts to improve the mechanical properties of the powders have included melt compounding an impact modifier with the polymer. Unfortunately, this approach produces pellets that need to be cryogenically milled, then sieved and classified before they can be used in the AM powder bed processes, which is time consuming and costly.

SUMMARY

It is therefore an object of aspects of the present invention to address one or more of the abovementioned, or other problems. In particular, it is an object of aspects of the present invention to provide an additive manufacturing composition that has improved powder flow in combination with good mechanical properties and surface finish.

According to a first aspect of the present invention there is provided an additive manufacturing composition for powder bed processes as claimed herein.

Advantageously, the impact modified polymer beads have been found to provide good powder flow, and in addition the printed articles have sufficient toughness and more uniform roughness on the article's surface.

Previously, it has been known to incorporate impact modifier into bead polymers. However, such a technique is usually too problematic and commercially unattractive to be carried out. The emulsion polymerisation process results in the presence of residual emulsifiers, salts, initiators, etc. in the impact modifier causing suspension polymerisation defects such as bead agglomeration or suspension collapse or significant reactor fouling.

Furthermore, commercial impact modifier powders are generally significantly greater in particle size than the 20-125 micron diameter particle size range desired for AM powder bed processes.

In U.S. Pat. No. 3,427,274 an alkali treated impact modified core-shell particle was produced by adding methyl methacrylate to a butadiene-styrene latex and subjecting the mixture to emulsion polymerisation followed by spray drying, alkaline treatment and washing to remove the sulphur containing compounds of the core-shell spray dried particles. The particles were then suspension polymerised by adding them to a methyl methacrylate suspension using starch as the suspension colloid. However, the amounts of impact modifier incorporated into the bead are relatively low and the alkali treatment is not commercially attractive.

It has been found that a significant amount of polymer powder particles of greater than 200 microns in diameter can result in printed articles that have an excessively rough surface or insufficiently melted polymer particles. Too many polymer particles of less than 20 microns in diameter can cause operational problems such as the creation of a dust cloud when depositing the fresh layer of powder during the AM process.

Particle size herein can be determined by laser diffraction analysis using particle size analysers such as a Coulter LS230 laser diffraction instrument. Such instruments determine the particle size distribution of a polymer powder, which can then be characterised in different ways. A useful measure of particle size is the median value of the particle size distribution, also known as the d50 particle size. d50 is a standard "percentile" reading from the particle size analysis and is the size in microns at which 50% of the sample is smaller and 50% is larger. The particle size distribution can also be analysed by determining the percentage of particles that are smaller or larger than a particular size.

In typical embodiments of the invention, at least 85% w/w of the first type of impact modified polymer beads have a particle size of between ≥20 μm and ≤200 μm, typically, at least 85% w/w of the first type of impact modified polymer beads have a particle size of between, ≥20 μm and ≤125 μm, more typically, at least 90% w/w of the first type of impact modified polymer beads have a particle size of between ≥20 µm and ≤125 µm, most typically, at least 99% w/w of the first type of impact modified polymer beads have a particle size of at least 5 µm.

Typically, in the invention the d50 particle size of the first type of impact modified polymer beads is ≥40 µm and ≤90 µm.

On average the said first type of impact modified polymer beads of the invention typically comprise greater than 5% w/w impact modifier. Typically, the level of impact modifier in the polymer bead is up to 60 wt %, such as between 5 wt % to 50 wt %, typically between 7.5 to 40 wt %.

Further Types of Impact Modified Bead Polymer and Non-Impact Modified Bead Polymers In some embodiments, the compositions of the invention include one or more further types of impact modified polymer beads which may be defined in the same manner as the said first type of impact modified polymer bead. It will therefore be appreciated that such further types may notwithstanding this definition have differences with the first type such as Mw, Tg, nature of (co)monomer(s) and the amounts and relative proportions thereof, nature of impact modifier and amounts thereof, and particle size.

In some embodiments, the compositions of the invention further include non-impact modified polymer beads. The non-impact modified bead polymers may be selected from those defined herein for the impact modified acrylic or vinyl (co)polymer matrix.

The typical particle size for the non-impact modified bead polymers are in accordance with those set out herein for the impact modified bead polymers.

The weight average molecular weight (Mw) and the Tg of the non-impact modified bead polymers is in accordance with those set out for impact modified bead polymers herein.

When included in the compositions or other aspects of the present invention, the amount of non-impact modified bead polymer to blend with impact-modified bead polymer can be varied in the ratio non-impact modified bead polymer: impact-modified bead polymer 0:100% w/w to 90:10% w/w, more typically 0:100% w/w to 80:20% w/w, most typically 0:100% w/w to 70:30% w/w.

Blending of non-impact modified bead polymer and impact-modified bead polymer can be carried out by conventional batch or continuous blending techniques, for example by use of a cone blender, rotary blender, ribbon blender or fluidised bed mixer.

The impact-modified polymer beads may be used on their own for additive manufacturing such as laser sintering or heat sintering processes or as part of a mixture with non-impact modified polymer beads. It may be advantageous to do so if the impact modified bead polymer has been prepared using functionalised impact modifiers that result in a cross-linked bead, for example Hypro™ polybutadiene and poly(acrylonitrile-co-butadiene) reactive liquid rubbers.

DETAILED DESCRIPTION

Suspension Polymerisation

It is known in the art of polymerisation that "bead" polymers are formed by suspension polymerisation.

Suspension polymerisation, also known as dispersion polymerisation, is a heterogeneous radical polymerisation whereby polymer is formed in monomer, or monomer-solvent droplets in a continuous phase that is a non-solvent for both the monomer and the formed polymer. Normally the continuous phase is water. The initiator for suspension polymerization is generally located mainly in the monomer phase. Suspension polymerization can produce particle sizes ranging from around 100 nm up to 5 mm. Advantageously, however, it has been found possible to produce beads with the above particle sizes and with excellent flow characteristics suitable for additive manufacturing. Significantly better results are obtained when the impact modifier is a core-shell impact modifier that is crosslinked, at least in the outer shell, or otherwise substantially insoluble or sparingly soluble in the (co)monomers used to form the (co)polymer bead matrix of the invention or is an oligomer or reactive oligomer with a molecular weight (Mw)≤10000, more typically, ≤5000, most typically ≤3000, which oligomers may be soluble in the (co)monomers of the matrix (co)polymer. The reactive oligomers may incorporate into the growing matrix polymer chain or may crosslink with the matrix (co)polymer or may form branches thereon. Alternatively, the impact modifier is a rubbery (co)polymer.

Such impact modifier provides better control over particle size and the d50 particle size.

As the polymerisation proceeds, the monomers in the dispersed phase react to form polymer which remains in the dispersed phase in bead form. The reaction temperature may vary according to the type of monomers and initiator which are used and is typically between 20 and 150° C., for example in the range 50-120° C.

Suspension polymerisation of acrylic and vinyl monomers is well known and has been described in a number of literature reviews, for example Suspension Polymerisation; H. G. Yuan, G. Kalfas, and W. H. Ray; JMS-REV. Macromol. Chem. Phys.; C31(2&3); 215-299; 1991.

When impact modifiers, such as those formed by emulsion polymerisation, are included in the suspension polymerisation it had been found that the presence of residual components, such as emulsifiers, salts and initiators, may cause suspension polymerisation defects such as bead agglomeration or suspension collapse or significant reactor fouling. The impact of the residual components can also affect the structural properties of any products formed from the beads, such as water resistance. A pre-treatment step wherein the impact modifier is washed with an alkali solution can be required to remove the residual components.

However, in an aspect of the present invention, it has surprisingly been found that an impact modifier may be added to a suspension polymerisation mixture without an alkali pre-wash and still produce impact modified polymer beads that are suitable for use in an additive manufacturing composition such as to provide the advantageous effects of the present invention, namely good powder flow, and the production of printed articles having sufficient toughness and more uniform roughness on the article's surface.

Therefore, according to a further aspect of the present invention there is provided a process for the production of impact modified polymer beads by a suspension polymerisation process as claimed herein.

Additionally, in the above aspect of the present invention the suspension polymerisation process can produce polymer beads with the appropriate particle size and/or (d50) particle size in a one-step process (i.e. without further post-forming of the beads) without having to resort to time consuming pelletising, milling, sieving and classification of other polymers used in powder bed technologies that are produced by melt processing.

It has been surprisingly found that the water soluble polymeric dispersing agents of the aspects of the invention herein provide advantageous dispersion in the suspension polymerisation by regulating droplet size and stabilising the suspension.

Such dispersing agents are well known in the art and include modified cellulose polymers (e.g. hydroxyethyl, hydroxypropyl, hydroxypropyl methyl), polyacrylic acid, polymethacrylic acid, partially and fully neutralised versions of these acids, poly(vinyl alcohol) and poly(vinyl alcohol—co-vinyl acetate) copolymers. The dispersion of monomers in the continuous phase is normally maintained by agitation at high speed throughout the polymerisation process to help keep the dispersion stable, to enable good heat transfer between the continuous phase and the dispersed droplets or particles and to control bead particle size.

The bead polymer may be produced using any necessary further components for effecting polymerisation, such as initiators and chain transfer agents. Suitable initiators and chain transfer agents are well known to the skilled person.

Examples of suitable initiators include: azo compounds, peroxides, peroxyesters and persulfates, specifically, azobis (isobutyronitrile), azobis(2-methylbutyronitrile), azobis(2, 4-dimethylvaleronitrile), azobis(4-cyanovaleric acid), dilauroyl peroxide, tert-butyl peroxyneodecanoate, dibenzyl peroxide, cumyl peroxide, tert-butylperoxy-2-ethyl hexanoate, tert-butyl peroxydiethyl acetate, tert-butyl peroxy benzoate and tert-butyl hydroperoxide.

Examples of chain transfer agents for control of molecular weight include: thiol compounds, cobalt compounds, alphamethyl styrene dimer, and aliphatic alcohols. The thiol compounds include monofunctional and multifunctional thiols. Monofunctional thiols include, but are not limited to, propyl mercaptan, butyl mercaptan, hexyl mercaptan, octyl mercaptan, dodecyl mercaptan, thioglycollic acid, mercaptopropionic acid, alkyl thioglycollates, for example: 2-ethylhexyl thioglycollate, or octylthioglycollate, mercaptoethanol, thiolactic acid and thiobutyric acid. Multifunctional thiols include di, tri, tetra and higher functionality thiols.

Another aspect of the invention extends to compositions comprising the impact modified beads formed by the suspension polymerisation process of the above aspect.

Additive Manufacturing

The compositions of the aspects of the present invention are particularly suited for use in additive manufacturing. Therefore, according to a further aspect of the present invention there is provided an additive manufacturing process as claimed herein.

Suitably, the three dimensional product of the invention is produced by repeating at least the dispensing and fusing steps for a plurality of layers such that fused portions of successive layers fuse to portions of immediately prior layers to form the article.

It has further been found that additive manufacturing by laser or heat sintering of the impact modified polymer particles is particularly advantageous as it provides an additional reduction in brittleness compared to ink jet binding. It is also anticipated that additive manufacturing by the new technology of microwave sintering of the impact modified polymer particles will be similarly advantageous An appropriate source for laser sintering includes the laser sintering 3D printers from 3D Systems Inc. and EOS GmbH (Electro Optical Systems), for example, the Formiga P100 laser sintering machine using a carbon dioxide laser. Heat sintering sources include the heat sintering 3D printers from Hewlett-Packard (for example Multi Jet Fusion 3D printer), Blueprinter (for example a Blueprinter M3 3D printer) or the University of Sheffield's High Speed Sintering (HSS) process.

As claimed the additive manufacturing process may include enhancers such as heat absorbers. Suitable heat absorbers include carbon black; and/or a graphite-based suspension comprising water, graphite and isopropanol.

Infra-red heat sources include infra-red radiant heating such as short wave or medium wave IR radiant sources from Infrared Systems UK According to a further aspect of the present invention, there is provided an additive manufactured article as claimed herein.

According to a further aspect of the present invention, there is provided use of a composition as claimed herein.

The invention also extends to a additive manufacturing cartridge for a 3-D printer comprising a composition as claimed herein or a replacement additive manufacturing hopper.

It will be appreciated that any of the features or optional features set out herein for any of the aspects of the invention may also be applied to any of the other aspects mutatis mutandis.

It will be appreciated that the impact modified particles of aspects of the invention wherein they are referred to may not necessarily be polymer beads.

Typically, the polymer beads or polymer particles of the aspects of the present invention are substantially solid. As such, typically the polymer beads or polymer particles are substantially not porous.

The weight average molecular weight (Mw) of the matrix of the polymer beads or polymer particles of the aspects of the present invention may be in the range of between $\geq 5,000$ and $\leq 3,000,000$ Daltons (Da), more typically $\geq 10,000$ and $\leq 1,000,000$ Da, most typically $\geq 30,000$ and $\leq 800,000$ Da. The weight average molecular weight can be determined by Gel Permeation Chromatography (also known as Size Exclusion Chromatography) calibrated against narrow polydispersity polystyrene or poly(methyl methacrylate) standards and using tetrahydrofuran as solvent.

The matrix of the polymer beads or polymer particles of the aspects of the present invention may be formulated and polymerised so as to produce a wide range of glass transition temperature (Tg) values (as measured by differential scanning calorimetry). Suitably, a Tg of between 15° C. to 150° C., more typically 30° C. to 140° C., still more typically 50° C. to 130° C., most typically 60° C. to 125° C.

Impact Modifiers

Impact modifiers are additives that improve the impact strength of materials. Accordingly, an impact modified polymer bead or particle is one produced by suspension polymerisation (bead) or otherwise (particle) that includes an additive that improves the impact strength thereof and therefore the impact strength of materials produced therefrom. This is achieved by adding impact modifiers to the suspension polymerisation or other form of polymerisation. Suitably, the impact modifier of the aspects of the present invention whether the first type or otherwise may improve the impact strength of the additive manufactured product produced from the bead or particle by at least 10%, such as at least 20% or 30% compared to one not containing the impact modifier. Typically, the improved impact strength as defined above is measured by notched Izod impact strength according to the method described in ASTM D256 or ISO180.

In impact modified polymer beads of the present invention, the impact modifier may form elastomeric regions in the bead. Specifically, in the case of core-shell impact modified beads, the impact modifier may form discrete elastomeric phases in the bead and the acrylic or vinyl (co)polymer matrix forms a continuous phase in the bead. Still further, in addition or alternatively to forming elastomeric regions itself, the impact modifier may be polymerised into the acrylic or vinyl (co)polymer to form elastomeric regions in the polymer chains. Even further the impact modifier may crosslink the matrix (co)polymer and provide elastomeric regions in the resulting network or form branches off the matrix (co)polymer.

Suitable impact modifiers of the aspects of the present invention are those known to one of ordinary skill in the art, and include, but are not limited to, core-shell, oligomers, reactive oligomers and (co)polymers. Suitable impact modifiers may include random, block, radial block, dendrimer, branched and/or graft polymer types.

Typically, the impact modifier is not a core-shell alkali treated impact modifier.

Typically, the impact modifiers are selected from acrylic (such as n-butyl acrylate-styrene), styrene (such as MBS and SBR), silicone (including silicone-acrylic), nitrile rubber, isoprene, butadiene, isobutylene and aliphatic polyurethane, polyether oligomer, polyester oligomer modifiers.

Typically, the impact modifier is an acrylic, butadiene, aliphatic polyurethane or silicone-acrylic impact modifier.

Core-Shell

The core-shell impact modifier may be present in the (co)polymer matrix in one or more of several different forms. For example, an elastic core in a glassy matrix shell; multiple elastic cores in a glassy matrix; core-shell particle(s) comprising an elastic core and one or more glassy shells and/or a glassy core and an elastic shell, in a glassy matrix.

Suitable core-shell particles are discrete particles made by multi-stage graft copolymerisation normally by emulsion polymerisation techniques, each having a multi-layer structure and generally used to improve the impact resistance of polymers such as acrylic materials. A wide variety of these particles is available which differ in the type of copolymers from which they are made and the number and volume of shells present around the core. The elastomeric component may be present in the core or shell depending on the application. In addition, there may be one or more shells.

In some embodiments, the core is made from a glassy (co)polymer such as methacrylate (co)polymer and the first shell provides the rubbery material having a low Tg, typically made from an acrylic (such as n-butyl acrylate-styrene), styrene (such as MBS and SBR), silicone (including silicone-acrylic) modifiers, for example 0-25% by weight of a styrenic monomer and 75-100% by weight of an acrylic monomer. This shell is often formulated to provide a rubbery character for impact modification. Alternatively, the rubbery material as defined below forms the core and the glassy material as defined below forms the shell.

A typical type of copolymer to form the rubbery component of the core is based on acrylic (such as n-butyl acrylate-styrene), styrene (such as MBS and SBR), silicone (including silicone-acrylic), nitrile rubber, isoprene, butadiene, isobutylene and aliphatic polyurethane modifiers, A second or subsequent shell may also be present.

The glassy component may have a Tg of >0° C., typically Tg>20° C. The glassy component can be chosen from any thermoplastic meeting the Tg requirements. Typically, the glassy component is composed primarily of methacrylate ester units, acrylate ester units, styrenic units, or a mixture thereof. Methacrylate esters units include, but are not limited to, methyl methacrylate, ethyl methacrylate, n-propyl methacrylate, isopropyl methacrylate, n-butyl methacrylate, isobutyl methacrylate, sec -butyl methacrylate, tert-butyl methacrylate, amyl methacrylate, isoamyl methacrylate, n-hexyl methacrylate, cyclohexyl methacrylate, 2-ethyl-hexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate and 2- methoxyethyl methacrylate. Acrylate ester units include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Styrenic units include styrene, and derivatives thereof such as, but not limited to, alpha-methyl styrene, and para methyl styrene.

Typically, the glassy component comprises a methyl methacrylate or styrene (co)polymer.

The elastomeric component, typically the first shell layer, typically has a Tg of less than 0° C., and typically less than −20° C.

Typical elastomers in the present invention include (co)polymers of acrylic (such as n-butyl acrylate-styrene), styrene (such as MBS and SBR), silicone (including silicone-acrylic), nitrile rubber, isoprene, butadiene, isobutylene and aliphatic polyurethane modifiers, and mixtures thereof. The acrylic elastomeric component may be composed mainly of acrylate ester units. Acrylate ester units useful in forming the elastomeric layer include, but are not limited to, methyl acrylate, ethyl acrylate, n-propyl acrylate, isopropyl acrylate, n-butyl acrylate, isobutyl acrylate, sec- butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate and 2-methoxyethyl acrylate. Typically the acrylate ester units are chosen from methyl acrylate, ethyl acrylate, n-butyl acrylate, 2-ethylhexyl acrylate and octyl acrylate. Useful dienes include, but are not limited to isoprene and butadiene. Useful styrenics include, but are not limited to alpha-methyl styrene, and para-methyl styrene.

Typically the total amount of elastomeric component in the core-shell impact modifier is from 30-90 weight percent, more typically from 40-85 weight percent, and most typically from 50-80 weight percent, based on the total weight of the impact modifier particle.

The shell layers can include one or more further shell layers, having a Tg>0° C., more typically Tg>20° C., typically selected from the list above for the glassy component. The further shell layer may be the same or different composition from a glassy core layer. A level of functionalization may be included in the shell, to aid in compatibility with the (co)polymer matrix.

The core-shell impact modifiers can be produced by any known technique for preparing multiple-stage, sequentially-produced polymers, for example, by emulsion polymerizing a subsequent stage mixture of monomers in the presence of a previously formed polymeric product. In this specification, the term "sequentially emulsion polymerized" or "sequentially emulsion produced" refers to polymers which are prepared in aqueous dispersion or emulsion and in which successive monomer charges are polymerized onto or in the presence of a preformed latex prepared by the polymerization of a prior monomer charge and stage. In this type of polymerization, the succeeding stage is attached to and intimately associated with the preceding stage. The core-shell impact modifiers may also be prepared by "mini-emulsion" techniques whereby a preformed polymer is emulsified into stable droplets of between 50 and 500 nm in size onto which successive monomer charges are polymerized. Such a technique is particularly suitable for cores of polyisobutylene, polybutadiene, polyisoprene, nitrile rubber and aliphatic polyurethane (co)polymers.

Specific examples of a silicone impact modifier may include polydimethylsiloxane, polymethylphenylsiloxane, graft-copolymers obtained by graft-polymerization of such as methyl methacrylate, styrene, or acrylonitrile in the presence of a copolymer of dimethylsiloxane and diphenylsiloxane, and the like or the crosslinked reaction products of the condensation polymerization between cyclic siloxanes such as octamethylcyclotetrasiloxane, triethoxysilane and trimethoxysilylpropylmethacrylate. Typically, the impact modifier is a silicone-acrylic based impact modifier, more typically a core-shell silicone-acrylic based impact modifier.

For the purposes of the present disclosure, "sparingly soluble" in relation to the impact modifier is defined as having a solubility in the respective monomer mixture at 25° C. which maintains the Brookfield viscosity of the organic phase comprising impact modifier prior to polymerisation ≤4,000 centipoise, more typically less than 3,500 centipoise. Viscosity may be measured using a Brookfield Viscometer model UK RVDVE with Spindle 5, speed 10 rpm at a temperature of 25° C.

Suitably, the core-shell impact modifiers may comprise between 0.05 to 20.00% of crosslinker by weight of the impact modifier, typically between 0.1 to 10.0 by weight.

Crosslinking in the impact modifier is provided by a crosslinker moiety formed from a polyfunctional crosslinking agent or combination thereof that reacted with functionality of the impact modifier either during polymerisation of the impact modifier or subsequently to form crosslinks within and among the polymer chains of the impact modifier. In general, the crosslinking agent can be a non-polymeric compound, i.e., a molecular compound that includes two or more reactively functional terminal moieties linked by a bond or a non-polymeric (nonrepeating) linking component. By way of example, the crosslinking agent can include but is not limited to acrylates, methacrylates, allylics, vinylics, trialkoxysilanes, tetraalkoxysilanes, trialkoxysilylpropyl-methacrylates, trialkoxyvinylsilanes, di-epoxides, polyfunctional epoxides, diisocyanates, polyisocyanates, polyhydric alcohols, water-soluble carbodiimides, diamines, diaminoalkanes, polyfunctional carboxylic acids, diacid halides, and so forth.

Examples of an acrylate, methacrylate, allylic or vinylic crosslinking agent include divinylbenzene, allyl(meth)acrylate, ethylene glycol di(meth)acrylate, diallyl phthalate, dicyclopentadiene di(meth)acrylate, trimethylolpropane tri(meth)acrylate, pentaerythritol hexa(meth)acrylate, 1,4-butanediol di(meth)acrylate, and 1,6-hexanediol di(meth)acrylate.

Examples of silane crosslinking agents include trimethoxysilane, triethoxysilane, tetramethoxysilane, tetraethoxysilane, trimethoxymethylsilane, triethoxymethylsilane, triethoxyphenylsilane. Examples of silane grafting monomers include triethoxyvinylsilane, 3-(trimethoxysilyl)propyl acrylate and 3-(trimethoxysilyl)propyl methacrylate Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxyiic acid (both cis and trans), 1,4-hexylenedicarboxylic acid, adipic acid, azelaic acid, dicarboxyi dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3- propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl~, 5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 4-cyclohexane dimethanol (including its cis- and trans-isomers), triethylene glycol, 1,0-decanediol, and the like.

Exemplary diamines that may be utilized as crosslinking agents can include, without limitation, isophorone-diamine, ethylenediamine, 1,2-, 1,3-propylene-diamine, N-methyl-1,3-propyiene-diamine, N,N'-dimethyl-ethylene-diamine, and aromatic diamines, such as, for example, 2,4- and 2,6-toluoylene- diamine, 3,5-diethyl-2,4- and/or -2,6-toluoylene-diamine, and primary ortho- di-, tri- and/or tetraalkyl-substituted 4,4'-diaminodiphenyl-methanes. (cyclo)aliphatic diamines, such as, for example, isophoronediamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene- diamine, 3,5-diethyl-2,4- and/or -2,6-toiuoylene-diamine, and primary ortho- di-, tri- and/or tetraalkyl-substituted 4,4'-diaminodiphenyl-methanes.

Oligomers

The oligomeric impact modifier may be present in the (co)polymer matrix in one or more of several different forms.

The oligomers of the present invention include oligomeric liquid rubbers having a Mw≤10000. Generally, the oligomers are soluble in the acrylic or vinyl matrix monomers. Typical oligomers include polybutadiene, polyisoprene and poly(acrylonitrile-co-butadiene) oligomers: aliphatic urethane oligomers; polyether oligomers, polyester oligomers; polydimethylsiloxane and polymethylphenylsiloxane oligomers Suitable examples thereof include Hypro™ polybutadiene from CVC Thermoset Specialities, Chemigum® poly(acrylonitrile-co-butadiene) elastomers from Omnova Solutions, Sartomer aliphatic urethane oligomers from Arkema, Genomer aliphatic urethane oligomers from Rahn; polyethyleneglycol from Croda, polypropylene glycol from Dow, Dynapol® polyester resins from Evonik and SiSiB® polydimethylsiloxane or polymethylphenylsiloxane from SiSiB Silicones Reactive Oligomers The reactive oligomers of the present invention include functionalised liquid rubbers having a Mw≤10000. Generally, the oligomers are soluble in the acrylic or vinyl matrix monomers used. Typically, the oligomers are capable of polymerising into the growing matrix (co)polymer chain and/or crosslinking the matrix (co)polymer. Typical reactive oligomers include methacrylate or acrylate di, tri or higher functional butadiene, isoprene and acrylonitrile-co-butadiene oligomers, acrylate functional aliphatic urethane oligomers, vinyl functional polydimethylsiloxane and vinyl functional polymethylphenylsiloxane Suitable examples include Hypro® methacrylate and acrylate-functionalized polybutadiene reactive liquid rubbers from CVC Thermoset Specialties, Sartomer aliphatic urethane acrylate oligomers from Arkema, Genomer aliphatic urethane acrylate oligomers from Rahn, and SiSiB® vinyl functional polydimethylsiloxane or polymethylphenylsiloxane oligomers from SiSiB Silicones (Co)Polymers Suitable impact modifier (co)polymers include polyisobutylene, polybutadiene, polyisoprene, nitrile rubber and aliphatic polyurethane (co)polymers Nitrile rubber derived impact modifiers are synthetic rubbers that are commonly derived from the random polymerization of acrylonitrile with butadiene by free radical catalysis. Such impact modifiers may have different levels of acrylonitrile, and, for purposes of the present invention, it is desired that the bound acrylonitrile content be in the range of from about 18 to about 50% w/w nitrile rubber. A typical nitrile rubber component is an acrylonitrile-butadiene copolymer.

The impact modifiers may also be prepared by "miniemulsion" techniques whereby a preformed polymer is emulsified into stable droplets of between 50 and 500 nm in size onto which successive monomer charges are polymerized. Such a technique is particularly suitable for polyisobutylene, polybutadiene, polyisoprene, nitrile rubber and aliphatic polyurethane (co)polymers.

Suitable commercially available impact modifiers of the present invention include Durastrength® acrylic impact modifiers from Arkema; Clearstrength® MBS (MMA-butadiene styrene) impact modifiers from Arkema; Metablen® W type acrylic impact modifier from MRC; Metablen® C-type MBS type impact modifiers from MRC; Metablen® S-type silicone acrylic impact modifier from MRC; Chemigum® poly(acrylonitrile-co-butadiene) elastomers from Omnova Solutions; Hypro™ polybutadiene reactive liquid rubbers from CVC Thermoset Specialties, and aliphatic urethane acrylate oligomers from Sartomer.

The impact modifiers are preferably selected to optimise viscosity of the suspension droplets during suspension polymerisation. If the impact modifier dissolves in the monomer droplets to the extent that a significant increase in viscosity of the monomer droplets takes place then the monomer droplets may become larger in size due to a reduction in the effectiveness of the agitator and suspending agents in the suspension polymerisation to control monomer droplet size. Further, an increase in viscosity may lead to the monomer droplets becoming unstable and coalescing with each other, again creating a tendency to increase the particle size, so that the final bead polymer has a particle size in excess of that required by the invention. Accordingly, as detailed above better control of particle size is obtained in the invention when the impact modifier is a core-shell impact modifier crosslinked, at least in its outer shell, or otherwise substantially insoluble or sparingly soluble in the (co)monomers used to form the (co)polymer bead matrix of the invention or is an oligomer or reactive oligomer with a molecular weight (Mw)≤10000, more typically, ≤5000, most typically ≤3000, which oligomers may be soluble in the (co)monomers of the matrix (co)polymer. The reactive oligomers may incorporate into the growing matrix polymer chain or may crosslink with the matrix (co)polymer. Due to their molecular weight, the oligomers do not appreciably affect the viscosity of the monomer droplet during polymerisation. The impact modifiers of the invention can therefore be used so that on average the impact modified polymer beads comprise greater than 5% w/w impact modifier. Hitherto this was not possible without unacceptable increases in particle size.

Typically, the Brookfield viscosity of the organic phase comprising impact modifier prior to polymerisation is less than 4,000 centipoise, more typically less than 3,500 centipoise. Viscosity may be measured using a Brookfield Viscometer model UK RVDVE with Spindle 5, speed 10 rpm at a temperature of 25° C.

(Co)Polymer Matrix

The acrylic or vinyl (co)polymer matrix of the polymer beads or particles of the aspects of the present invention may comprise one or more types of (co)polymer. The (co)polymer(s) of the matrix may be a homopolymer of acrylic monomer such as methyl methacrylate, and/or a vinyl monomer such as styrene; or a copolymer(s) of acrylic monomer such as methyl methacrylate, and/or a vinyl monomer such as styrene, optionally with one or more other acrylic or vinyl monomers.

In the aspects of the present invention, the (co)polymer of the matrix may comprise 70-100% acrylic and/or vinyl residues by weight of the (co)polymer, for example 70-99.9% by weight, or 90 to 99% by weight. The (co)polymer of the matrix may comprise 0-30% by weight of one or more acrylic or vinyl other monomer residues, for example 0.1-30% by weight, or 1-10% by weight.

Typically, the acrylic residues or other acrylic residues are residues of monomers selected from one or more of the group consisting of methyl methacrylate, methyl acrylate, ethyl methacrylate, ethyl acrylate, n-butyl acrylate, iso-butyl acrylate, t-butyl acrylate, n-butyl methacrylate, iso-butyl methacrylate, t-butyl methacrylate, 2-ethylhexyl methacrylate, 2-ethylhexyl acrylate, lauryl methacrylate, lauryl acrylate, cyclohexyl acrylate, cyclohexyl methacrylate, isobornyl acrylate, isobornyl methacrylate, methacrylic acid, acrylic acid; hydroxyl-functional acrylates such as 2-hydroxyethyl methacrylate, hydroxypropylethyl methacrylate, 2-hydroxyethyl acrylate, and hydroxypropyl acrylate. Vinyl monomer residues or other vinyl monomer residues may be selected from residues of the monomers styrene, vinyl pyrrolidone, vinyl pyridine, vinyl acetate, vinyl toluene, alphamethyl styrene.

Typically, the acrylic residues are residues of one or more $C_1$-$C_{10}$alkyl ($C_0$-$C_1$alk)acrylate monomers, such as one or more of the group consisting of methyl methacrylate, methyl acrylate, ethyl methacrylate, ethyl acrylate, n-butyl acrylate, iso-butyl acrylate, t-butyl acrylate, n-butyl methacrylate, iso-butyl methacrylate, t-butyl methacrylate, 2-ethylhexyl methacrylate, and 2-ethylhexyl acrylate, more typically one or more of the group consisting of methyl methacrylate, methyl acrylate, ethyl methacrylate, ethyl acrylate, n-butyl methacrylate and n-butyl acrylate, most typically, methyl methacrylate and n-butyl acrylate.

Typically, the vinyl monomer residues are residues selected from one or more of the group of monomers consisting of; styrene, alphamethyl styrene, vinyl toluene, vinyl pyrrolidone, vinyl pyridine and vinyl acetate, most typically styrene.

Further Additives

The composition according to aspects of the present invention may comprise any suitable further additive. Such further additives may be selected from one or more of a flow modifier and/or an antistatic agent.

Suitable flow modifiers include alumina, silica, zinc stearate and stearate coated calcium carbonat Suitable antistatic agents include long-chain aliphatic amines (optionally ethoxylated) and amides, quaternary ammonium salts (e.g., behentrimonium chloride or cocamidopropyl betaine), esters of phosphoric acid, polyethylene glycol esters, or polyols, include long-chain alkyl phenols, ethoxylated amines, and glycerol esters, such as glycerol monostearate.

Definitions

An acrylic or vinyl (co)polymer as defined herein is a (co)polymer wherein the main monomer or only monomer is an acrylic monomer or wherein the main or only monomer is a vinyl monomer wherein by main monomer is meant forming more than 50% of the monomer residues of the (co)polymer. Accordingly, it will be understood that the term (co)polymer herein encompasses homopolymers.

The term "alkyl" when used herein, means, unless otherwise specified, $C_1$ to $C_{12}$ alkyl and includes methyl, ethyl, ethenyl, propyl, propenyl butyl, butenyl, pentyl, pentenyl, hexyl, hexenyl and heptyl groups, typically, the alkyl groups are selected from methyl, ethyl, propyl, butyl, pentyl and hexyl, more typically, methyl. Unless otherwise specified, alkyl groups may, when there is a sufficient number of carbon atoms, be linear or branched, be cyclic, acyclic or part cyclic/acyclic, be unsubstituted, substituted or terminated by one or more substituents selected from —$OR^{19}$, —$OC(O)R^{20}$, —$C(O)R^{21}$, —$C(O)OR^{22}$, —$NR^{23}R^{24}$, —$C(O)NR^{25}R^{26}$, —$SR^{29}$, —$C(O)SR^{30}$, —$C(S)NR^{27}R^{28}$, wherein $R^{19}$ to $R^{30}$ here and generally herein each independently represent hydrogen, or unsubstituted or substituted alkyl. Typically, the alkyl groups are unsubstituted, typically, linear and typically, saturated.

The term "alk" or the like should, in the absence of information to the contrary, be taken to be in accordance with the above definition of "alkyl" and wherein the parenthesised (alk) term means the presence of alkyl is optional and wherein "$C_0$ alk" also means non-substituted with an alkyl.

By reactive oligomers herein is meant an impact modifier that can be polymerised into the growing acrylic or vinyl (co)polymer during polymerisation thereof or that can crosslink with a matrix polymer chain. Accordingly, the reactive oligomer may include acrylic or vinyl end groups. Suitable end groups include methacrylate, acrylate, styrenic, allylic, or any other end group of general structure —$CR=CH_2$, where R may be hydrogen, alkyl, phenyl, oxyalkyl, oxyphenyl or carboxyl, Non-impact modified polymer beads means in the context of the invention polymer beads known to those skilled in the art which do not include an impact modifier or any substantive amount thereof effective to affect the impact properties of the additive manufactured products produced from polymer bead as defined herein i.e. improvement of impact strength by at least 10%, as measured by Izod notched impact strength (ASTM D256 or ISO180)

The invention will now be described by way of example only with reference to the following examples.

EXAMPLES

Characterisation Techniques:

The particle size of the impact-modified bead polymers was determined using a Coulter LS230 laser diffraction instrument. d50 is a standard "percentile" reading from the particle size analysis and is the size in microns at which 50% of the sample is smaller and 50% is larger. The particle size distribution was also analysed to determine the percentage of particles that are smaller or larger than a particular size.

Example 1

Preparation of a Silicone-Acrylic Impact-Modified Bead Polymer by Firstly Dispersing the Impact Modifier in the Organic Phase before Commencing Suspension Polymerisation Firstly, 100 grams of Metablen® S-2030 silicone-acrylic impact modifier (available from Mitsubishi Rayon Co. Ltd.) is added to 873.0 grams of methyl methacrylate, 27.0 grams of n-butyl acrylate and 7.65 grams of n-dodecyl mercaptan in a 2 litre glass flask equipped with a stainless steel anchor-type stirrer. The mixture is then stirred at room temperature for 1 hour at a stirrer speed of 1500-1900 revolutions per minute (rpm). 17.0 grams of lauroyl peroxide initiator is then added and the mixture is stirred at 1500 rpm for a further 15 minutes at room temperature. This forms the organic phase of the suspension polymerization.

Separately, the aqueous phase of the suspension polymerization is prepared by adding 2,200 ml of deionized water, 19.4 grams of hydroxyethyl cellulose powder (Natrosol HEC 250HR from Aqualon Ltd), 6.5 grams of trisodium phosphate and 8.0 grams of sulphated alkyl phenol ethoxylate solution (0.5% wt in deionized water) to a 5 litre glass flask containing a stainless steel anchor-type stirrer. The flask contents are stirred and heated to 40° C. for 1 hour to dissolve the hydroxyethyl cellulose and other aqueous phase ingredients. The organic phase containing the dispersed impact modifier is then added, the stirring rate is increased to 700 rpm and the contents of the reactor flask heated to 80° C. using a water bath. The polymerization is continued at 80° C. until the flask contents experience an exotherm, typically to approximately 90-92° C. The flask is then cooled and the resultant impact-modified polymer beads are filtered, washed with deionised water, dried in an air circulating oven overnight at 50° C. and sieved. The resultant product has a d50 particle size of 78.9 microns, 100% of the polymer beads have a particle size >5 µm and 94.0% of polymer beads are ≥20 µm and ≤125 µm in size, as determined using a Coulter LS230 laser diffraction instrument.

Example 2

Preparation of a Silicone-Acrylic Impact-Modified Bead Polymer by Dispersing the Impact Modifier in the Mixture of Organic Phase and Aqueous Phase before Commencing Suspension Polymerisation The aqueous phase of the suspension polymerization is prepared by adding 2,200 ml of deionized water and 19.4 grams of hydroxyethyl cellulose powder (Natrosol HEC 250HR from Aqualon Ltd), 6.5 grams of trisodium phosphate and 8.0 grams of sulphated alkyl phenol ethoxylate solution (0.5% wt in deionized water) to a 5 litre glass flask containing a stainless steel anchor-type stirrer. The flask contents are stirred and heated to 30° C. for 1 hour to dissolve the hydroxyethyl cellulose and other aqueous phase ingredients. The stirring rate is then increased to 700 rpm. 150 grams of Metablen® S-2030 silicone-acrylic impact modifier (available from Mitsubishi Rayon Co. Ltd.) are then added, followed by 824.5 grams of methyl methacrylate, 25.5 grams of n-butyl acrylate and 7.65 grams of n-dodecyl mercaptan. The mixture is stirred at 700 rpm for 2 hours to disperse the impact modifier within the organic phase. 17.0 grams of lauroyl peroxide initiator is then added and allowed to dissolve in the organic phase. The contents of the flask are heated to 80° C. using a water bath whilst continuing to stir at 700 rpm. The polymerization is continued at 80° C. until the flask contents experience an exotherm, typically to approximately 90-92° C. The flask is then cooled and the resultant impact-modified polymer beads are filtered, washed with deionised water, dried in an air circulating oven overnight at 50° C. and sieved. The resultant product has a d50 particle size of 72.3 microns, 100% of the polymer beads have a particle size >5 µm and 92.8% of polymer beads are ≥20 µm and ≤125 µm in size, as determined using a Coulter LS230 laser diffraction instrument.

Example 3

Use of an Acrylate-Functionalized Polybutadiene Impact Modifier to Make an Impact-Modified Bead Polymer by Suspension Polymerisation which is then Blended with Non-Impact Modified Bead Polymer to Make a Bead Mixture Suitable for Laser Sintering or Heat Sintering Firstly, 100 grams of Hypro® Reactive Liquid Polymer 1300×33LL acrylate-functionalized polybutadiene (available from from CVC Thermoset Specialties) is added to 873 grams of methyl methacrylate, 27 grams of n-butyl acrylate and 7.7 grams of n-dodecyl mercaptan in a 2 litre glass flask equipped with a stainless steel anchor-type stirrer and the mixture is stirred at room temperature for 1 hour. 17.0 grams of lauroyl peroxide initiator is then added and the mixture is stirred for a further 15 minutes at room temperature. This forms the organic phase of the suspension polymerization.

Separately, the aqueous phase of the suspension polymerization is prepared by adding 2,200 ml of deionized water and 19.4 grams of hydroxyethyl cellulose powder (Natrosol HEC 250HR from Aqualon Ltd) to a 5 litre glass flask containing a stainless steel anchor-type stirrer. The flask contents are stirred and heated to 40° C. for 1 hour to dissolve the hydroxyethyl cellulose. The organic phase containing the dispersed impact modifier is then added, the stirring rate is increased to 700 rpm and the contents of the reactor flask heated to 80° C. using a water bath. The polymerization is continued at 80° C. until the flask contents experience an exotherm, typically to approximately 90-92° C. The flask is then cooled and the resultant impact-modified polymer beads are filtered, washed with deionised water, dried in an air circulating oven overnight at 50° C. and sieved. The resultant product has a d50 particle size of 45.2 microns 100% of the polymer beads have a particle size >5 µm and 95.2% of polymer beads are ≥20 µm and ≤125 µm in size, as determined using a Coulter LS230 laser diffraction instrument.

30 parts by weight of the impact-modified polymer beads are then dry blended with 70 parts by weight of non-impact modified polymer beads of composition poly(methyl methacrylate-co-n-butyl acrylate), Mw 40,000 and d50 particle size of 89.3 microns as determined using a Coulter LS230 laser diffraction instrument.

Sintering Techniques

The impact-modified bead polymers and bead polymer mixtures described in examples 1 to 3 are susceptible to laser sintering using an EOS Formiga P100 laser sintering machine available from EOS GmbH. Sintering is carried out using a carbon dioxide laser and the polymer powder is subjected to an energy density of between 0.05 to 0.15 J/mm².

Energy density is calculated according to the following equation (Equation 1, page 248 in Goodridge et al, Progress in Materials Science, volume 57, pages 229-267 (2012)).

Energy density=laser power (Watts)/[scan spacing (mm)×laser scan speed (mm/sec)]

Likewise, the impact-modified bead polymers and bead polymer mixtures described in examples 1 to 3 are susceptible to heat sintering by heating the bead polymer particles between 180° C. to 220° C. during each pass of the heat sintering 3D printer.

In each case, the printed articles thus produced are easily removed from the powder bed for visual examination as prototypes or for testing such as determination of mechanical properties.

Comparative Example 1

Preparation of a Non-Impact Modified Acrylic Bead Polymer by Suspension Polymerisation The aqueous phase of the suspension polymerization is prepared by adding 1,700 ml of deionized water, 20.0 grams of polyacrylic acid (25% solution in deionized water—Acusol 190 from Dow) and 12.0 grams of sodium sulphate to a 5 litre round bottom glass flask containing a stainless steel anchor-type stirrer. The flask contents are stirred at 400 rpm and heated to 30° C. for 15 minutes to dissolve the aqueous phase ingredients. The stirring rate is then increased to 600 rpm. The organic phase for the suspension polymerization is prepared by dissolving 20.0 grams of lauroyl peroxide in a mixture of 970.0 grams of methyl methacrylate, 30.0 grams of n-butyl acrylate and 9.0 grams of n-dodecyl mercaptan at room temperature. The organic phase is then added to the reaction flask. The contents of the flask are heated to 86° C. using a water bath whilst continuing to stir at 600 rpm. The polymerization is continued at 80° C. until the flask contents experience an exotherm, typically to approximately 90-92° C. The flask is then cooled and the resultant polymer beads are filtered, washed with deionised water, dried in an air circulating oven overnight at 50° C. and sieved. The resultant product has a d50 particle size of 80.4 microns, 100% of the polymer beads have a particle size >5 µm and 95.6% of polymer beads are ≥20 µm and ≤125 µm in size, as determined using a Coulter LS230 laser diffraction instrument and weight average molecular weight (Mw) of 42,000 as determined by gel permeation chromatography using THF solvent and PMMA standards.

Although comparative when used alone, these polymer beads may be dry blended with the impact modified beads of the present invention to provide a composition according to the invention.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An additive manufacturing composition for powder bed processes comprising at least a first type of impact modified polymer beads formed by suspension polymerization, wherein the first type of impact modified polymer beads comprises
   a) an acrylic or vinyl (co)polymer matrix, and
   b) an impact modifier;
   wherein at least 85% w/w of the first type of impact modified polymer beads have a particle size of between ≥20 μm and ≤125 μm; and
   wherein in component a) the (co)polymer matrix comprises 70-100% alkyl (alk)acrylate and/or styrene residues by weight of the (co)polymer matrix, and 0-30% by weight of one or more other vinyl monomer residues, wherein, the impact modifier is selected from one or more of (co)polymers, oligomers or reactive oligomers having a Mw of between 1000 and 10000, or core-shell impact modifiers.

2. The composition according to claim 1, wherein a d50 particle size of the first type of impact modified polymer beads is ≥40 μm and ≤90 μm.

3. The composition according to claim 1, wherein the impact modifier is selected from the group consisting of acrylic, styrene, silicone, nitrile rubber, isoprene, butadiene, isobutylene and aliphatic polyurethane, polyether oligomer and polyester oligomer modifiers.

4. The composition according to claim 1, wherein an amount of impact modifier in the first type of impact modified polymer bead is up to 60 wt %.

5. The composition according to claim 1, further comprising a flow modifier and/or an antistatic agent.

6. The composition according to claim 1, wherein the impact modifier is crosslinked, or otherwise substantially insoluble or sparingly soluble in the (co)monomers used to form the (co)polymer matrix of part a) or is an oligomer or reactive oligomer with a molecular weight (Mw)≤10000.

7. The composition according to claim 1, wherein the impact modifier forms elastomeric regions in the first type of impact modified polymer bead and the acrylic or vinyl (co)polymer matrix forms a continuous phase in the first type of impact modified polymer bead.

8. The composition according to claim 1, wherein the composition includes one or more further types of impact modified polymer beads.

9. The composition according to claim 8, wherein at least 85% w/w of the one or more further types of impact modified polymer beads have a particle size of between ≥20 μm and ≤200 μm.

10. The composition according to claim 1, wherein the composition further includes non-impact modified polymer beads.

11. The composition according to claim 10, wherein at least 85% w/w of the said one or more non-impact modified polymer beads have a particle size of between ≥20 μm and ≤200 μm.

12. An additive manufacturing cartridge or replacement hopper comprising a composition according to claim 1.

13. An additive manufacturing composition comprising at least a first type of impact modified polymer beads formed by suspension polymerization, wherein the first type of impact modified polymer beads comprises
   a) an acrylic or vinyl (co)polymer matrix, and
   b) an impact modifier;
   wherein at least 85% w/w of the first type of impact modified polymer beads has a particle size of between ≥20 μm and ≤125 μm; and
   wherein on average the first type of impact modified polymer beads comprises greater than 5% w/w impact modifier, wherein, the impact modifier is selected from one or more of (co)polymers, oligomers or reactive oligomers having a Mw of between 1000 and 10000, or core-shell impact modifiers.

14. A process for the production of impact modified polymer beads by a suspension polymerisation process comprising the steps of:
   a. providing a suspension comprising;
      i. impact modifier,
      ii. acrylic or vinyl (co)monomer(s),
      iii. water, and
      iv. a water soluble polymeric dispersing agent such that i and ii form a discontinuous organic phase and iii and iv form a continuous aqueous phase of the suspension;
   b. suspension polymerising the discontinuous organic phase of a; and
   c. optionally, extracting the impact modified polymer beads,
   d. wherein a viscosity of monomer droplets in the discontinuous organic phase is such that at least 90% w/w thereof have a particle size of between ≥20 μm and ≤200 μm,
   wherein the impact modified polymer beads comprise:
      a) an acrylic or vinyl (co)polymer matrix, and
      b) an impact modifier;
   wherein at least 85% w/w of the impact modified polymer beads have a particle size of between ≥20 μm and ≤125 μm and the impact modifier is selected from one or more of (co)polymers, oligomers or reactive oligomers having a Mw of between 1000 and 10000, or core-shell impact modifiers.

15. The process according to claim 14, wherein the impact modifier is non-alkali treated.

16. The process according to claim 14, wherein a Brookfield viscosity of the discontinuous organic phase prior to polymerization is less than 4,000 centipoise.

* * * * *